J. Swartz.
Mower.
No. 1314 Reissued Jun. 3, 1862.
Fig. 1
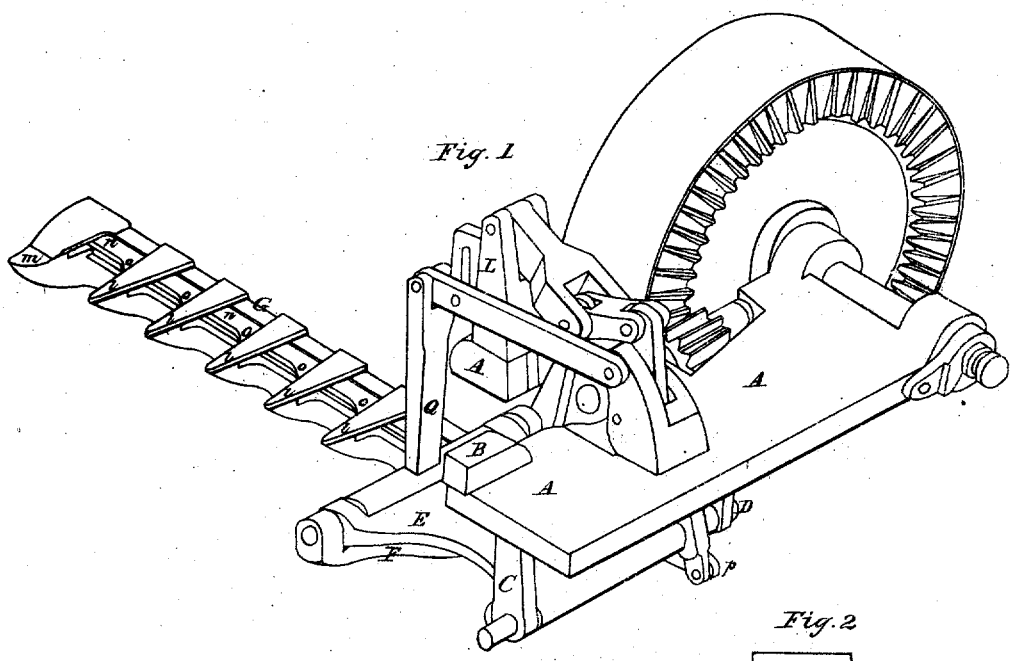
Fig. 2
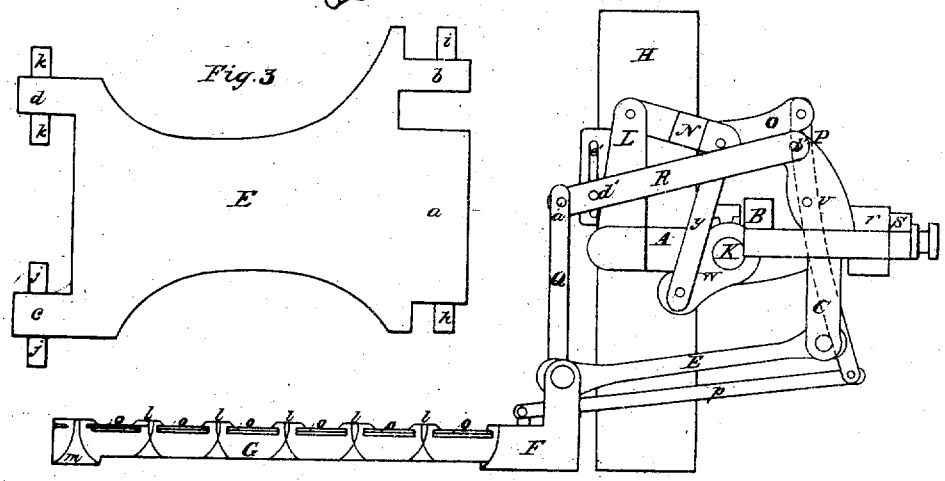
Fig. 3
Fig. 4
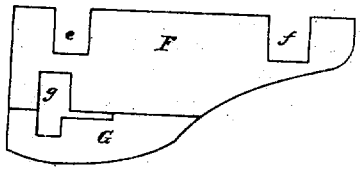
Witnesses
Wm. H. Harrison
Wm. H. Bates.
Inventor
Jacob Swartz by atty
Andrew Whiteley

UNITED STATES PATENT OFFICE.

JACOB SWARTZ, OF BUFFALO, NEW YORK.

IMPROVEMENT IN HARVESTERS.

Specification forming part of Letters Patent No. 11,951, dated November 14, 1854; Reissue No. 970, dated June 5, 1860; Reissue No. 1,314, dated June 3, 1862.

DIVISION B.

*To all whom it may concern:*

Be it known that I, JACOB SWARTZ, of the city of Buffalo, in the county of Erie and State of New York, have invented new and useful Improvements in Grain and Grass Harvesters, of which the following is a full, clear, and exact description of the parts thereof requisite for a proper understanding of such of said improvements as are herein claimed, reference being had to the accompanying drawings, forming part of this specification, in which—

Figure 1 represents in perspective a side-cutting harvester embracing my improvements, certain parts only of which are herein claimed. Fig. 2 represents a front view of the same, with the bottom of the shoe and divider on the same horizontal line or resting on the common surface of the ground when the fingers are a little above it, which enables them to pass over small elevations of the surface, &c., without raising either the shoe or divider from the ground. Fig. 3 represents a top view of my coupling-arm and the hinge-pins which connect it to the hangers and the shoe to the arm; and Fig. 4 represents a side view of my improved shoe with the cavities therein for the branches of the coupling-arm, and in and between it and the finger-bar a guideway for the heel of the cutter-bar and a slot for the cutters.

The improvement claimed under this patent consists, first, in so constructing those parts of a harvester which, previous to my invention, varied the longitudinal distance between the inner end of the cutting apparatus and main frame when the cutting apparatus was raised or lowered in respect to said frame, and so connecting to said parts my improved shoe (which forms part of said cutting apparatus) that said parts will, when drawn forward by said main frame, draw forward said shoe, whose inner edge terminates at or near the inner end or heel of a finger-bar, which has no other connection with the main frame of the machine than that derived through said shoe, whose outer edge forms part of the cutting apparatus, the cutter-bar of which is caused to reciprocate its cutters across the fingers in straight lines by means of a guideway between the finger-bar and said shoe, whose front end is sloped forward and upward until it is sufficiently forward of and above the points of the fingers to slide and pass over the cut crop without dragging it, and whose upper portion has a hinge pin or pins passing lengthwise and horizontally through it at about right angles to the finger-bar, by which it (the shoe) is connected to the parts which connect it to the main frame of the machine.

It consists, secondly, in constructing the coupling-arm or its equivalent, which draws forward my improved shoe, and with it the finger-bar, and varies their longitudinal distance from the main frame of the machine to which they are attached when raised or lowered in respect thereto, substantially as hereinafter described, whereby certain advantages, hereinafter stated, are obtained which could not be by using a coupling-arm of uniform width its entire length, or to the same extent by using any other than my improved shoe.

The finger-bar which I use is of the short laterally-projecting class, and of that class which has no other connection with the main frame of the machine than that derived through a shoe at its heel, or through the hinge connecting the heel of the bar with the part or parts which vary its longitudinal distance from the frame. The shoe, fingers, and divider have at the front edge of the finger-bar slots, through which a scalloped cutter is reciprocated in a straight line. That end of the finger-bar which is connected to the shoe and terminates at or near its inner edge I call the "inner" end or "heel," and that end to which the divider is connected and which runs next to the uncut crop I call the "outer" end.

Of the parts herein specified, A represents the main frame of the machine, by which the other parts are sustained and drawn forward; B, the tongue by which it is drawn forward; C and D, two hangers, extending some distance below the frame. In the lower end of each of these hangers there is a hole in line with each other and with or nearly with the path of the machine. E, the coupling-arm, by which the cutting apparatus is connected to the hangers and its longitudinal distance from the main frame varied when raised or lowered in respect thereto. Through the branches of each end of the coupling-arm is a horizontal hole for the hinge-pins which hold it and the finger-bar (the shoe and divider at the ends of which follow all the ordinary undulations of the ground) about at right angles to the path of the machine. *a*, the front branch of the end of the coupling-arm, which is connected with hangers C and D; *b*, the rear branch of the same end; *c*, the front branch of its vibrating end, and *d* the rear branch of the same end.

By making the ends of the coupling-arm E or its equivalent forked or with a front and rear branch greater width can be obtained where the hinge-pins pass through, (with the same weight of material,) so that the arm and finger-bar will have less backward-and-forward play with the same tightness of the hinge-pins which connect it to the hangers, and the shoe to it, and so that each branch can be attached to a different member or part of the machine.

By having branch *b* extend farther back than branch *d* branch *b* forms a rear brace for branch *d*, and also enables branch *b* to be attached to the frame farther back than could otherwise be done. The cutters, when the pitman which gives them motion is in front of the ground and driving wheel, should be placed as far back as they can, as they are always so far forward as to bring too much of the weight of the machine and of the leverage of the main ground and driving wheel, when reciprocating the cutters, on the animals' necks. The capacity of having the cutters placed further back is greatly increased by making the central portion of the coupling-arm narrower than the ends, where greater width of its hinges are required for holding it in its position, as said central portion (as experience has shown) is the part which will be in front of the wheel when the arms's length is increased for so placing the tongue between the path of the wheel and cutting apparatus as to properly balance the machine and prevent side draft.

By extending branch *c* farther forward than branch *a* greater width between branches *c* and *d* is obtained than could be were branch *c* no farther forward than branch *a*, which increases the length of the shoe so much that a gentle forward and upward slope may be given to its front end for enabling it to pass over the cut crop without dragging it forward. The hinge-pins by which the shoe is connected to the branches of the coupling-arm, are placed sufficiently high to enable that end of the arm to pass over the cut crop without dragging it. F, the shoe, through which the finger-bar receives all its connections with the main frame of the machine; *e* and *f*, the cavities in said shoe for receiving the branches *c* and *d*; *g*, the guideway in and between the shoe and finger-bar for the heel of the cutter-bar, and a slot through which the cutters pass into the fingers and divider; *h*, the hinge-pin which couples branch *a* to hanger C; *i*, that which couples branch *b* to hanger D; *j*, that which couples the front end of shoe F to branch *c*, and *k* that which couples its rear end to branch *d*; G, the finger-bar, *l l l l l* its fingers, and *m* the divider at its outer end; *n*, the cutter-bar; *o o o o o o*, the cutters secured thereto, and *p* the pitman through which they receive their reciprocatory motion.

H represents the main ground and driving wheel, which carries the main frame and gives motion to the cutters; I, its axle, fast in it; *q* and *v*, the boxes in which this axle revolves; *s*, the drop-clutch, by which the main driving cog-gear is held in and out of gear with its pinion J on its shaft K, which revolves in its boxes *t* and *u*. L and M represent two posts, extending above the frame. To the upper end of L is hinged one end of a toggle-lever, N, to the other end of which is hinged one end of a toggle-lever, O, whose other end is hinged to the upper end of a vibrating lever, P, which is pivoted at *v* to post M, and has its other end hinged to pitman *p*. On the end of shaft K is placed a crank, *w*, in which is inserted a wrist-pin, on which is placed the lower end of a connecting-rod or pitman, *y*, through the upper end of which passes the hinge-pin which connects the toggle-levers N and O together.

It will be seen that by the arrangement of parts just described the cutters will receive two motions each way during every revolution of shaft K. Q represents the post which extends up from shoe F to arm R; *a'*, the hinge which connects its upper end with arm R, whose other end is hinged to post M by hinge-pin *b'*; *c'*, the vertical guide-slot in post L, through which the set-screw *d'* passes into arm R, which parts limit the extent of the vibration of the inner end of the cutting apparatus toward and from the main frame of the machine to the length of slot *c'*; but their operation need not be further described in this division, as it is fully described in another division filed simultaneously herewith.

In order to properly balance the machine and prevent side draft therein, (which is my design,) it may be necessary to place the tongue between the wheel and shoe. To do this the main frame's width and the coupling-arm's length require to be so much increased that the animal between the tongue and standing crop will not walk on the standing crop.

I do not wish to be understood as claiming broadly having originated that class of harvesters in which the longitudinal distance of the heel of the finger-bar from the main frame is varied as said heel is raised or lowered, or, in other words, in which the heel of the finger-bar is raised and lowered in the arc of a circle at right angles, or nearly so, to the plane of the main ground and driving wheel, as I am aware that such a harvester existed previous to my invention; but I am not aware that previous to my invention a cutting apparatus ever existed which contained all the elements or capacities of that set forth in the foregoing recital of invention was also connected to the main frame of a harvester by a coupling-arm or its equivalent (whatever the manner of its construction) which drew forward said cutting apparatus when drawn forward by the main frame of the machine and varied its longitudinal distance from said frame when raised or lowered in respect thereto. Neither am I aware that previous to my invention a cutting apparatus has been connected to the main frame of a harvester by a coupling-arm or its equivalent which drew said cutting apparatus forward and varied its longitudinal distance from said frame when raised or lowered in respect thereto which had any one of the peculiarities of my peculiarly-constructed coupling-arm. Therefore I do not wish to limit myself to the particular mode of constructing and connecting the parts shown and described, as it is obvious that various modifications may be made therein without departing from the principles and spirit of my invention.

What I claim under this patent is—

1. In combination with the main frame of a harvester and the finger-bar G and shoe F, or their equivalents, the coupling-arm E, or an equivalent thereof, which, when drawn forward by said main frame, will draw forward said finger-bar and vary the longitudinal distance of its heel from the frame when raised and lowered in respect thereto, substantially as described.

2. Making that end of the coupling-arm E or its equivalent which is connected with hangers C and D with a front and rear branch, for the purposes specified.

3. Making the vibrating end of the coupling-arm E or its equivalent with a front and rear branch, for the purposes specified.

4. Making the central portion of the coupling-arm E or its equivalent of less width than from the front of the front branch to the rear of the rear branch of its inner end where the hinge-pins pass through.

5. Making the central portion of the coupling-arm E or its equivalent of less width than from the front of the front branch to the rear of the rear branch of its vibrating end where the hinge-pins pass through.

6. Making the branch *b* of the coupling-arm E or its equivalent to extend farther back than its branch *d*.

7. Making the branch *c* of the coupling-arm E or its equivalent to extend farther forward than branch *a*.

8. Hinging branches *a* and *b* of the coupling-arm E or its equivalent each to a different member of the machine.

9. Causing branch *c* of the coupling-arm E or its equivalent to occupy one cavity in shoe F or its equivalent, and branch *d* to occupy a different cavity therein.

10. Placing the branch *d* of the coupling-arm E or its equivalent over the heel of the finger-bar and branch *c* in front of and of a corresponding height with branch *d*.

JACOB SWARTZ.

Witnesses:
JAMES GUNN,
ABRAM S. SWARTZ.